(12) United States Patent
Gomes De Oliveira et al.

(10) Patent No.: US 11,053,649 B2
(45) Date of Patent: Jul. 6, 2021

(54) CONSTRUCTIVE METHOD AND OPERATIONAL PROCESS FOR CREATION OF ARTIFICIAL BEACHES, SUITABLE FOR BATHING, AROUND PLOTS OF LAND

(71) Applicant: João Carlos Gomes De Oliveira, Santana de Parnaiba (BR)

(72) Inventors: João Carlos Gomes De Oliveira, Santana de Parnaiba (BR); Procópio Gomes De Oliveira Netto, Santana de Parnaiba (BR); Felipe Gomes De Oliveira, Santana de Parnaiba (BR); Daniel Gomes De Oliveira, Santana de Parnaiba (BR)

(73) Assignee: Joao Carlos Gomes De Oliveira, Santana de Parnaiba (BR)

( * ) Notice: Subject to any disclaimer, the term of this patent is extended or adjusted under 35 U.S.C. 154(b) by 63 days.

(21) Appl. No.: 16/386,030

(22) Filed: Apr. 16, 2019

(65) Prior Publication Data

US 2020/0283979 A1 Sep. 10, 2020

(30) Foreign Application Priority Data

Mar. 8, 2019 (BR) ...................... 10 2019 004590 6

(51) Int. Cl.
| | |
|---|---|
| *E02B 17/00* | (2006.01) |
| *E02B 5/02* | (2006.01) |
| *E04H 1/04* | (2006.01) |
| *E04H 3/00* | (2006.01) |
| *E04H 4/00* | (2006.01) |

(Continued)

(52) U.S. Cl.
CPC .................. *E02B 5/02* (2013.01); *A63G 3/00* (2013.01); *C02F 1/24* (2013.01); *C02F 1/52* (2013.01); *C02F 1/766* (2013.01); *E02B 17/00* (2013.01); *E04H 1/04* (2013.01); *E04H 3/00* (2013.01); *E04H 4/0006* (2013.01); *E04H 4/0081* (2013.01); *E04H 4/1281* (2013.01)

(58) Field of Classification Search
CPC ...................................................... E02B 17/00
See application file for complete search history.

(56) References Cited

U.S. PATENT DOCUMENTS

| | | |
|---|---|---|
| 4,806,048 A | 2/1989 | Ito |
| 10,422,096 B2 | 9/2019 | Scuero |

(Continued)

FOREIGN PATENT DOCUMENTS

| | | |
|---|---|---|
| BR | 9602467 A | 10/1998 |
| BR | 11 2015 005908 A2 | 8/2017 |

(Continued)

*Primary Examiner* — Sunil Singh
(74) *Attorney, Agent, or Firm* — Browdy and Neimark, P.L.L.C.

(57) ABSTRACT

Constructive method and operational process for creation of artificial beaches, suitable for bathing, around plots of land, more precisely, constructive method and operational process for creation of artificial beaches, allowing implementation of watercourses forming isles and/or peninsulas, that contains lots of condominium and/or subdivision, with formation of artificial beaches in perimeter of lots composing condominium and/or subdivision, watercourses are appropriate for contemplation and bathing by condominium members and/or owners of subdivision.

12 Claims, 5 Drawing Sheets

(51) Int. Cl.
  *A63G 3/00* (2006.01)
  *C02F 1/24* (2006.01)
  *C02F 1/52* (2006.01)
  *C02F 1/76* (2006.01)
  *E04H 4/12* (2006.01)

(56) References Cited

U.S. PATENT DOCUMENTS

2015/0218012 A1   8/2015  Gaid et al.
2020/0071897 A1*  3/2020  Parker .................... C02F 3/046

FOREIGN PATENT DOCUMENTS

| BR | 112017001737 A2 | 2/2018 |
| FR | 2839328 A1 | 11/2003 |
| JP | S6439408 A | 2/1989 |
| JP | H038915 B2 | 2/1991 |
| JP | H08136014 A | 5/1996 |

* cited by examiner

CONSTRUCTIVE METHOD AND OPERATIONAL PROCESS FOR CREATION OF ARTIFICIAL BEACHES, SUITABLE FOR BATHING, AROUND PLOTS OF LAND

FIELD OF DISCLOSURE

The present relates to a construction method for implementation of a condominium and/or subdivision with the creation of artificial beaches for bathing in format of isles and/or peninsulas and/or bays and/or lakes and/or like, that contains land plot, with formation of artificial beaches in the perimeter of land plot that composes a condominium and/or subdivision, in which water canals are proper for contemplation, bath and recreation of condominium members.

BACKGROUND OF INVENTION

Leisure has long become fundamental part of implementation of condominiums and/or subdivisions.

With implementation of green areas, multi-sports courts, gastronomic spaces, spaces for children, party room, swimming pools, etc., developers seek to demonstrate to consumers, that places of residence will have a specific area for leisure that is safe and quiet.

One of main attractions of condominium and/or subdivision is implementation of aquatic leisure, with construction of swimming pools, of most varied forms, either in external area, of common use, or internally, in condominium and/or subdivision.

Besides that, many condominiums and/or subdivisions have lakes for leisure and/or contemplation, of most varied forms.

All these solutions are already known and applied all over the world.

There are also condominiums and/or subdivisions close to beaches, and some plots of land of these condominiums and/or subdivisions are by water bodies (sea, river, big lakes, etc.), making it possible for residents to enjoy leisure a few meters from their residence.

Other condominium and/or subdivision plots not bordering water bodies (sea, river, big lakes, etc.) have the disadvantage that residents need to walk for many meters to access water bodies (sea, river, big lakes, etc.).

Additionally, lots bordering water bodies cannot all be contiguous, and passages must be staggered between them for access to water bodies (sea, river, big lakes, etc.).

However, these condominiums and/or subdivisions near the sea are increasingly rare on market, which consequently increases prices for their acquisition.

Thinking about this, the present inventors have developed a constructive method and operational process for the creation of artificial beaches, suitable for bathing, around plots of land, consisting of artificial beaches with low implementation and operation cost, especially if compared with other types of condominiums and/or subdivisions in natural beaches.

In a search of patent databases, only Document PI 0701058-3 was found, which deals with a condominium construction system, with certain architecture, focusing on the shape of blocks of condominium and the aesthetic arrangement of mentioned lots, without reference to leisure of condominium owners.

OBJECTIVES AND ADVANTAGES OF INVENTION

The present inventors are specialists in depollution of dammed water bodies or watercourses, holding dozens of patents already granted and operating for more than 35 years in this market.

Intending to use all knowledge acquired with watercourse treatment systems and water body in closed place, in concert with need for innovation in real estate market, the present construction method was developed, which allies safety, leisure and real estate improvement at low cost of implementation and operation.

The present constructive method foresees implementation of artificial beaches suitable for bathing, allowing, in its interior, formation of blocks of lots in condominium and/or subdivision, in the form of islands and/or peninsulas and/or bays and/or lakes and/or similar, with formation of channels of water flow involving referred lots.

Rounded bottom canals are excavated for water to flow around land plots, in a closed loop, forming isles on internal margins of excavated canals, and/or peninsulas on external margins of excavated canals, and/or bays and/or lakes.

Preferably, if excavated soil of main and secondary canals is adequate, it can be used for landfill and conformation of isles and/or peninsulas and/or bays and/or lakes, so that lots that make up said subdivision are at higher elevation than excavated canals.

Reinforced concrete, compacted clay soil or vinyl or plastic blanket are used for waterproofing of excavated canals, which will ensure that water stored in canals does not contact site groundwater.

On top of waterproofing, a layer of white or clear sand is used to form beaches all over area of excavated canal, in addition to natural beach-like landscaping.

In order to fill main and secondary canals, raw water from external source of any nature (river, sea, lake, reservoir, etc.) is collected, including polluted water, through a pumping system or by gravity through an interconnection canal and then treated by a water treatment plant, by a high-performance flow flotation system, with the addition of doses of sodium hypochlorite or other oxidizing agent, obtaining treated water suitable for use by bathers, without need to use filters or a water filtering process, which would be unfeasible because the main and secondary canals have a sand bottom.

For continuous treatment of water from excavated canals, water from excavated canals should be collected and routed upstream towards water treatment plant, to be treated together with water collected from an external source, to maintain the water quality levels of excavated canals.

Treated and chlorinated water is added at several points of the excavated canals, so that quality standards are kept all over points of the excavated canals, thus preventing any water areas with no treatment, no residual chlorine and no flow.

To help constant circulation of water and create water flow through the main and secondary canals, one or more axial pumping systems of high flow and low pressure are provided, which pumping system is contained inside protection grids and hidden at the bottom or side of the main canal, to prevent contact with bathers and consequent accidents.

This axial pumping system can also add doses of sodium hypochlorite or other oxidizing agent, ensuring appropriate distribution all over excavated canals of isle and/or peninsula and/or bay and/or lake.

It also comprises installation of mechanical or hydraulic pulse equipment, which, when releasing shock wave, creates waves or ripples in the excavated canals of the condominium and/or subdivision block.

The mechanical or hydraulic pulse equipment also helps in cleaning of the watercourse, once a shock wave released by said mechanical or hydraulic pulse in the watercourse causes any inert residues decanted in the excavated canals to circulate to the water treatment station by flowing flotation to be treated again.

An overflow system is also provided for treated water from the excavated canals of the condominium and/or subdivision block returning to the external water source, allowing complete drainage of the water of the excavated canals and occasional cleaning of the bottom of the excavated canals, using minimum amount of new external water, only to replace evaporation loss.

The water level in the excavated canals of the condominium and/or subdivision block is managed by equalization of raw water catchment from the external water source, and water drainage using a system of overflowing of internal water already treated, thereby keeping constant the water level of the excavated canals.

For access of condominium and/or subdivision members to subdivision blocks with format of isles, bridges, passageways or crossings over excavated canals or tunnels under excavated canals are built, so as not to prevent free circulation of watercourse inside the excavated canals.

One or more longitudinal streets are provided in blocks of the condominium and/or subdivision, from one end to other, for pedestrian traffic.

Complementing leisure structure, one or more recreational areas common to condominium and/or subdivision are planned, such as places with party room, restaurant, toilets, games room, etc.

DESCRIPTION OF DRAWINGS

To supplement this description and provide better understanding of characteristics of the construction method of subdivision block of lots shaped as island and/or peninsula and/or bay and/or lake, and in accordance with preferred practical implementation of the same, a set of drawings accompanies the attached description, in which, in exemplified manner, although not limitative, the following is represented.

DETAILED DESCRIPTION

Figure 1:
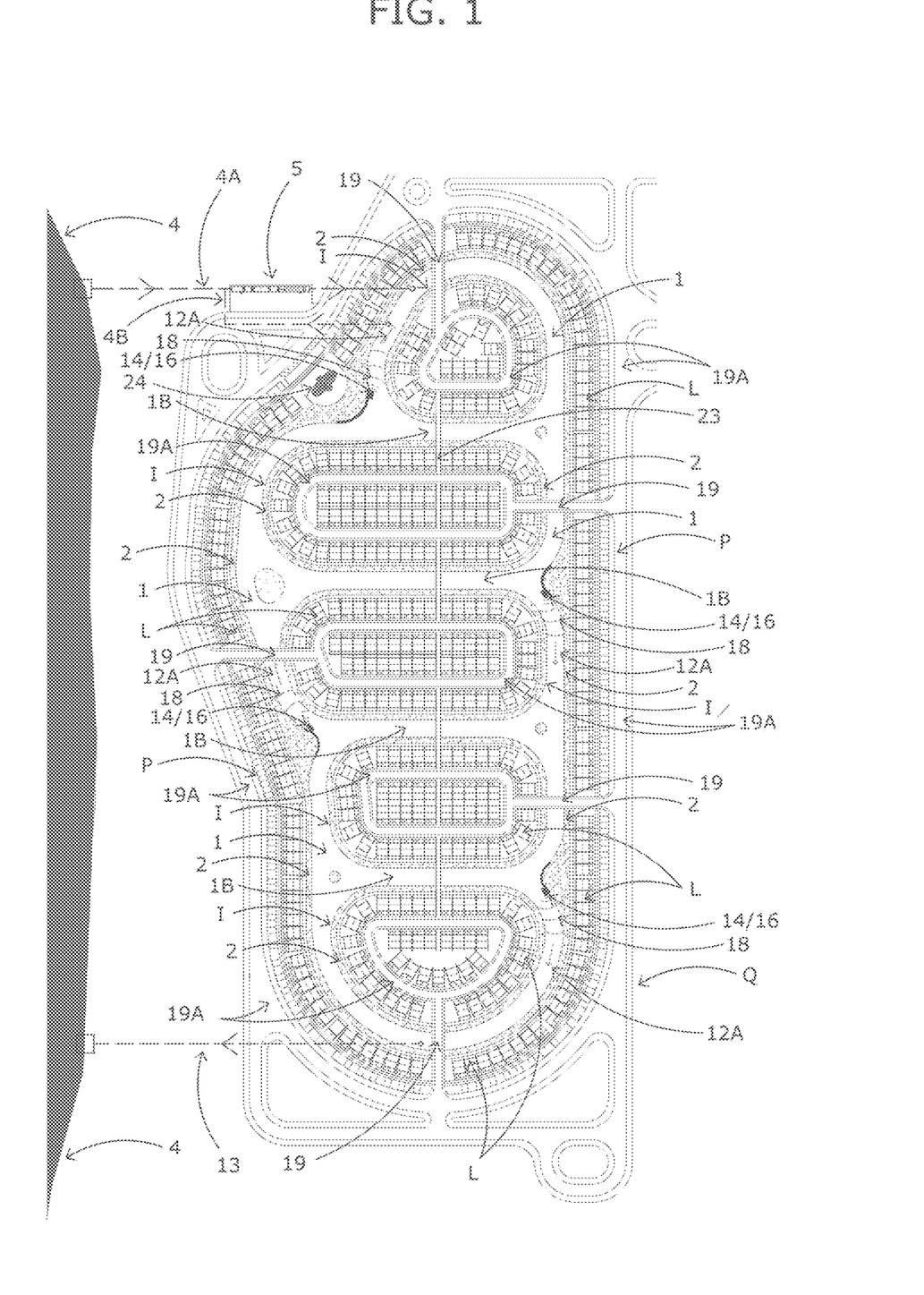
FIG. 1—Aerial view of a subdivision, showing blocks, lots, watercourse canals, beaches, bridges, pedestrian ways, etc.

Referring to drawings shown, this application refers to "CONSTRUCTIVE METHOD AND OPERATIONAL PROCESS FOR CREATION OF ARTIFICIAL BEACHES, SUITABLE FOR BATHING, AROUND PLOTS OF LAND", more precisely, a constructive method and operational process for the creation of artificial beaches, suitable for bathing, around plots of land, which allows implementation of watercourse canals (1) for formation of isles (I) and/or peninsulas (P), comprising lots (L) of condominium and/or subdivision, with formation of artificial beaches (2) in perimeter of lots (L), watercourse canals (1) being proper for contemplation and bathing by condominium members and/or owners of subdivision.

Figure 3:
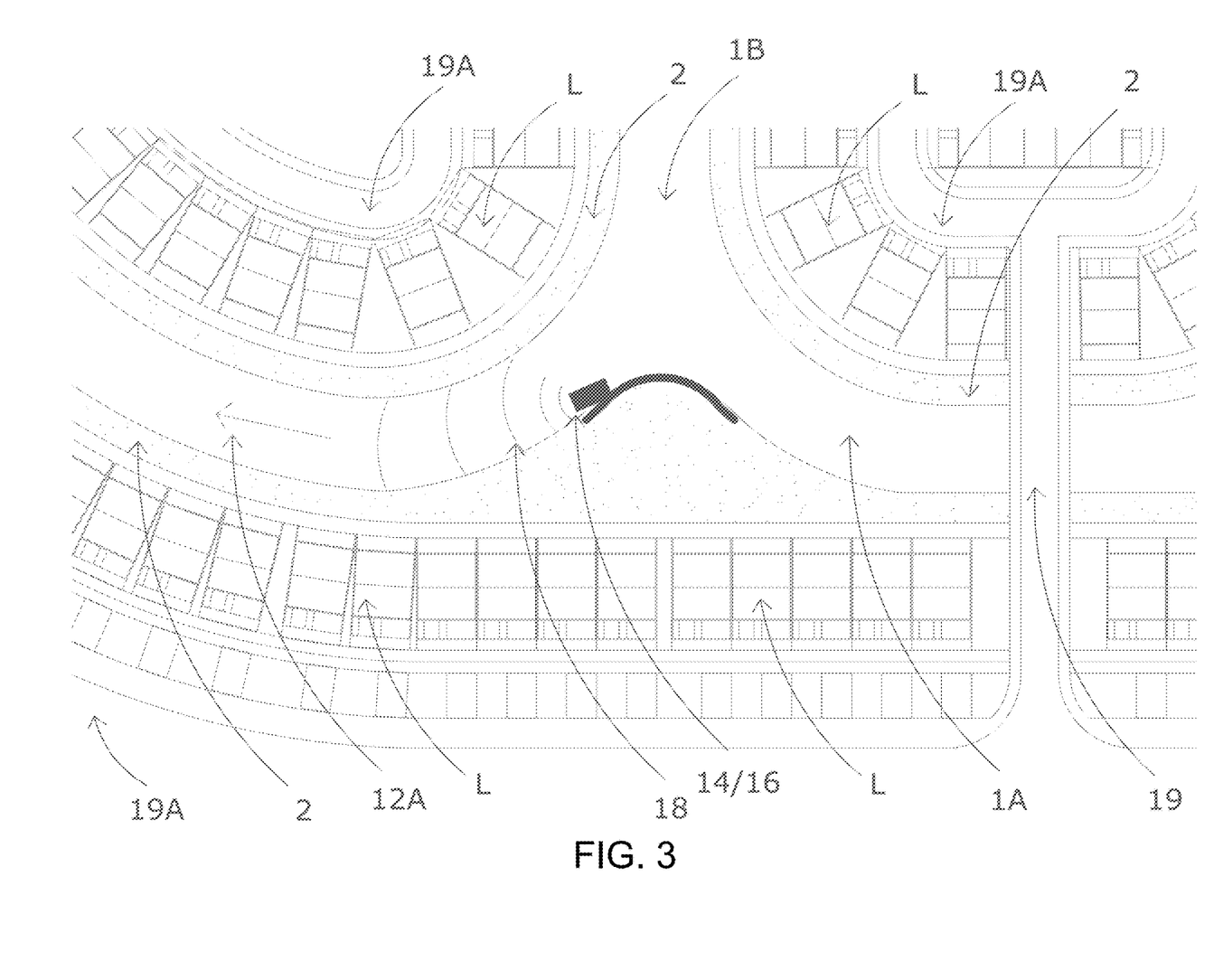
FIG. 3—Closer aerial view, showing watercourse canals, lots, beaches, bridge and axial pumping systems and mechanical or hydraulic pulse.

According to the constructive method, a main canal (1A) is excavated in closed loop, surrounding an entire block (Q) of lots (L), forming isles (I) and/or peninsulas (P) on banks of the main canal (1A) and secondary canals (1B) are excavated connecting the main canal (1A) of right to the main canal (1A) of left, to form isles (1) within block (Q) of lots (L).

Preferably, if excavated soil of the main and secondary canals (1A and 1B) is adequate, it can be used for landfill and conformation of isles (1) and/or peninsulas (P), so that lots (L) that make up a subdivision are at higher elevation than excavated canals (1A and 1B).

Figure 4:
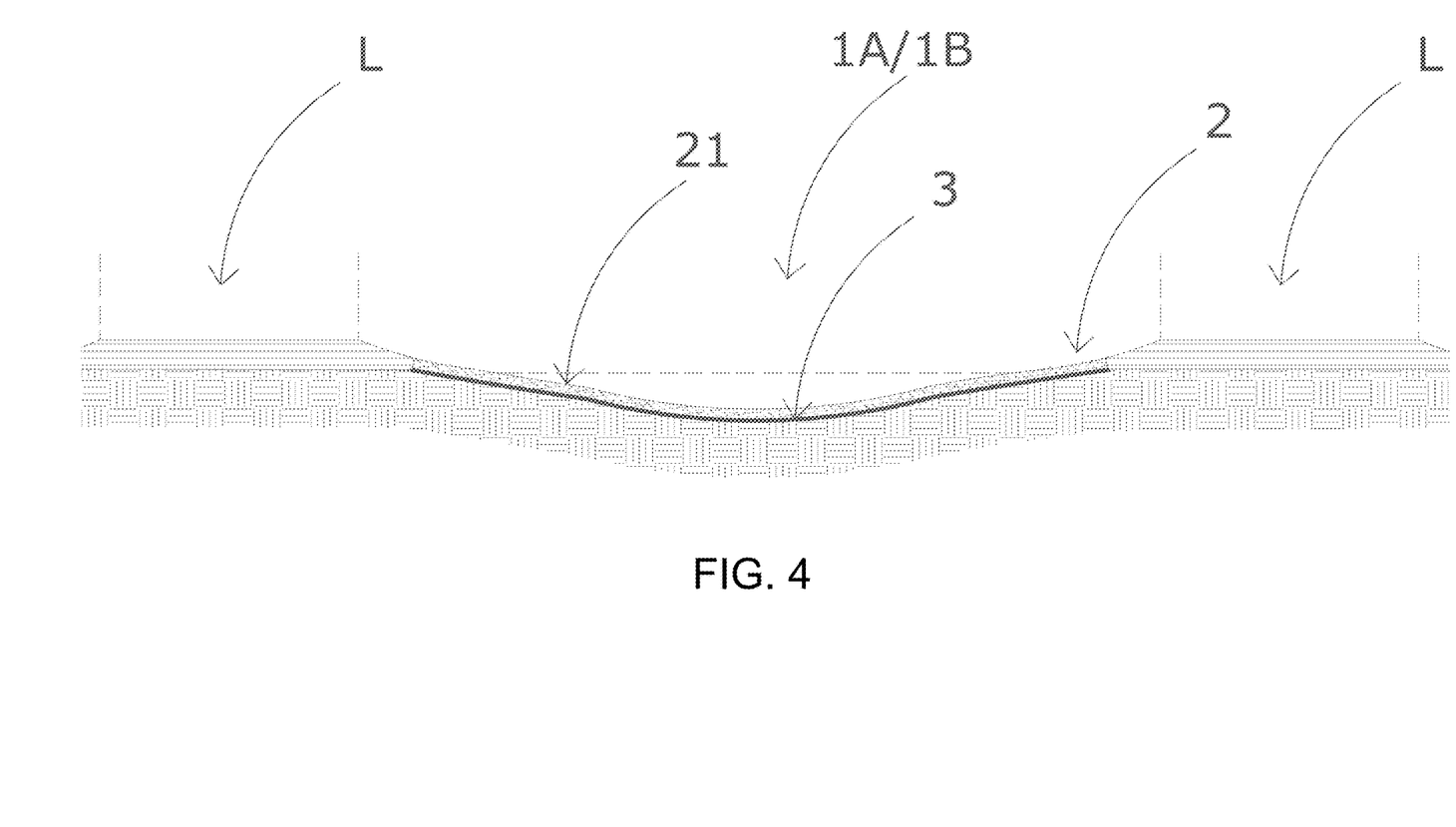
FIG. 4—Side view of a beach, showing watercourse canal, sand layer, access slope, bottom waterproofing and surrounding lots.

For waterproofing of the excavated main and secondary canals (1A and 1B), use of reinforced concrete, compacted clay soil, vinyl or plastic blanket (3) is foreseen, which will ensure that water stored in the main and secondary canals (1A and 1B) does not contact groundwater table of site.

Over waterproofing (3) a layer of white or clear sand (21) is provided to form beaches (2) all over the main and secondary canals (1A and 1B) excavated, in addition to natural beach-like landscaping.

Figure 2:
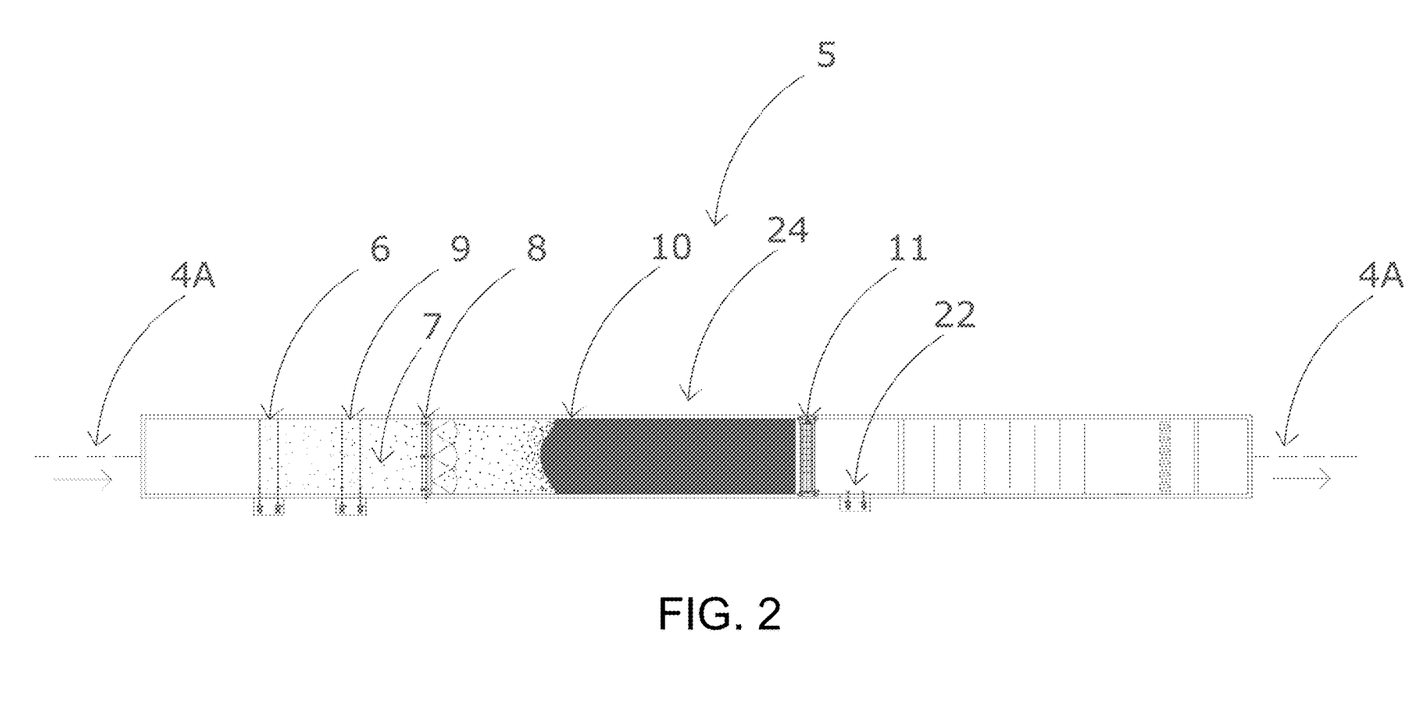
FIG. 2—View of a water treatment plant area by a high-performance flow flotation system.

For filling the main and secondary canals (1A and 1B) raw water (4) is collected from external water sources, of any nature (river, sea, lake, reservoir, etc.), including polluted water, through a pumping system or by gravity through piping or a connection canal (4A) which is then treated in a water treatment plant, by a high-performance flow flotation system (5), and sodium hypochlorite or other oxidizing agent is added in doses (22), making this treated water suitable for use by bathers.

High-performance flow flotation system (5) includes application of coagulant (6) and flocculant (9) material in a watercourse; allowing downstream aggregation of suspended particles (7), defining larger flakes; subjecting these aggregated and larger particles downstream watercourse to at least one stage of dissolution and injection of microbubbles (8) of air or concentrated oxygen, causing flotation of aggregated particles; allowing downstream agglomeration (10) of floated material to occur on the water surface, which is removed from the watercourse by a floating dredging wheel (11); and as a last step of treatment, sodium hypochlorite or other oxidizing agent (22) is added in doses into treated water to ensure its disinfection and use for bathing. This treatment process is efficient in removing more than 95% of pollutants, also eliminating odor and releasing oxygen-saturated water, without being necessary to perform any type of water filtration process, which would greatly increase costs of operation and be unfeasible because of sand on the canal bottom.

The treatment canal does not have any physical division or space between treatment stages, creating a continuous water treatment canal (24), ensuring maximum treatment capacity, increasing hydraulic detention time and consequently greater treatment capacity, thus reducing implementation and operation costs.

Coagulation (6) and flocculation (9) stages are performed in continuous flow (12) of the treatment canal with accurate control of power applied in coagulation (6) and flocculation (9) by injection (8) of thin, medium and thick bubbles with variable and controlled intensity, which increases efficiency of coagulant mixture and subsequent mixture of flocculant in water, and formation of clots (6) and later, formation of flakes (9), thus reducing consumption of these chemicals, and consequently their stock volume and cost of operation.

For continuous treatment of water in the main and secondary canals (1A and 1B), water will be collected (4B) from the main and secondary canals, and routed upstream to the water treatment station (5), to be treated with water collected from an external water source (4), to keep water quality levels of the mentioned canals of block (Q) of lots (L).

Main canal (1A) is provided with an overflow pipe or canal (13), used to equalize water level in the main and secondary canals (1A and 1B), and by this pipe or overflow canal (13), excess water already treated is returned to the external water source, avoiding overflow of the main and secondary canals (1A and 1B). This overflow pipe or canal (13) is also designed to completely empty the main and secondary canals (1A and 1B) to allow them to be completely emptied and maintained.

Figure 5A:
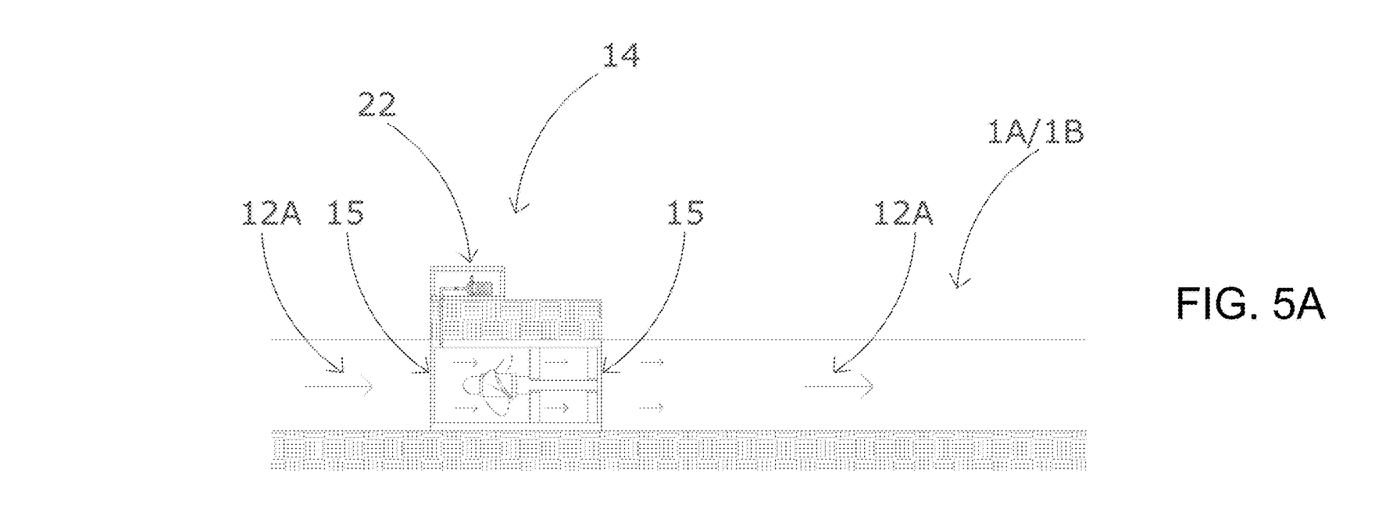
FIG. 5A—Side view of an axial pumping system which is responsible for flow in the watercourse canals.

To assist constant circulation and create water flow through the main and secondary canals (1A and 1B) of block (Q) of the condominium and/or subdivision, one or more axial pumping systems (14) of high flow and low pressure are provided, and pumping systems (14) are housed inside protection grids (15) and hidden at the bottom or banks of the canal (1), to avoid contact of bathers and consequent accidents.

Axial pumping system (14) can also perform add doses (22) of sodium hypochlorite or another oxidizing agent, ensuring adequate distribution all over main and secondary canals (1A and 1B) of block (Q).

Figure 5B:
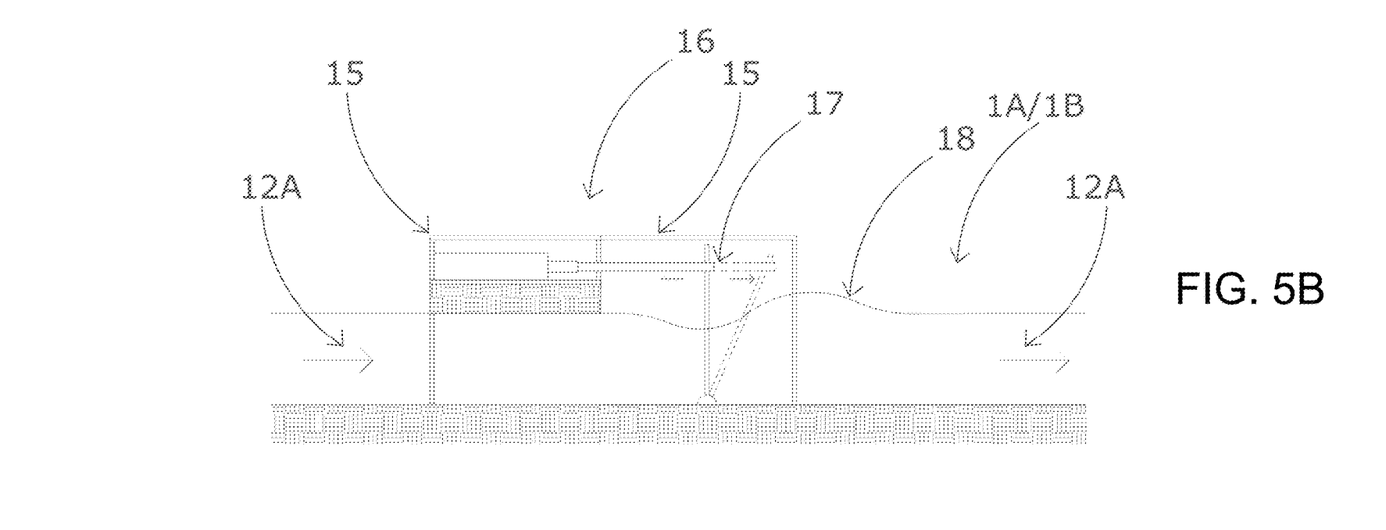
FIG. 5B—Side view of a mechanical or hydraulic pulse system, which is responsible for waves or ripples in watercourse canals.

Main and secondary canals (1A and 1B) also provide installation, in the same site where the axial pumping system is located (14), of another mechanical or hydraulic pulse equipment (16), which is also housed in protection grids (15) and hidden in banks of the canal (1), which, by releasing a shock wave (17), creates waves or ripples (18) in the main and secondary canals (1A and 1B) of the block (Q) of the condominium and/or subdivision.

Mechanical or hydraulic pulse equipment (16) also helps in cleaning of the watercourse canal (1A and 1B), once the shock wave (17) released by the mechanical or hydraulic pulse (16) in the watercourse, causes any residues eventually decanted in the main and secondary canals (1A and 1B), to move and circulate and they can be captured (4B) for continuous treatment in the water treatment station by flotation (5).

An overflow system (13) is also provided for treated water, from the main and secondary canals (1A and 1B) of the block (Q) of the condominium and/or subdivision, returning to the external water source, allowing complete drainage of water from the main and secondary canals (1A and 1B) and occasional cleaning of the bottom of the main and secondary canals (1A and 1B), using minimum amount of new external water, only to replace evaporation loss.

Water level in the main and secondary canals (1A and 1B) of the block (Q) of the condominium and/or subdivision is managed by equalization of a catchment (4) of raw water from the external water source, with drainage of water by the overflow system (13) of internal water already treated, keeping a constant water level in the main and secondary canals (1A and 1B).

For access of condominium and/or subdivision members to the block (Q), construction of bridges, passageways or crossings (19) over the main canal (1A) is foreseen, so as not to prevent free circulation of water flow (12A).

External and internal roads (19A) are provided for circulation of cars on isles (I) or peninsulas (P) and one or more pedestrian streets (23) connecting isles (I) of the condominium and/or subdivision, from one end to other.

Installation of one or more common recreational areas (24) of the condominium and/or subdivision is also planned.

The invention claimed is:

1. Construction method and operational process for creation of artificial beaches, suitable for bathing, around plots of land, for implementation of blocks of lots in format of isles and/or peninsulas, within an urban or rural subdivision, comprising excavating a main canal in a closed loop, which surrounds an entire block of lots, forming the isles and/or peninsulas, with the peninsulas formed on outer banks of this main canal, and excavating secondary canals connecting a first part of the main canal to a second part of the main canal, to form the isles within the block of lots, filling the main and secondary canals with water, collected from an external source, and routing the water, collected from the external source, to a water treatment plant, which performs treatment and depollution of the water by a high-performance flow flotation system, circulating the water in closed loop through the main and secondary canals, driven by axial pumping system and mechanical or hydraulic pulse, and maintaining water level in the main and secondary canals by an overflow point in the main canal, through which the water in the main and secondary canals is eliminated; and in banks of the main and secondary canals, providing white or clear sand to form the artificial beaches, of the white or clear sand.

2. Construction method and operational process according to claim 1, wherein soil removed from excavations of the main and secondary canals is used for landfill and formation of the isles and/or peninsulas.

3. Construction method and operational process, according to claim 1, comprising waterproofing the excavated main and secondary canals, with use at least one of reinforced concrete layer, compacted clay soil, vinyl or plastic blanket.

4. Construction method and operational process, according to claim 1, comprising applying waterproofing in the main and secondary canals, and over the waterproofing applied in the main and secondary canals, placing a layer of the white or clear sand to form the beaches in entire length of the main and secondary canals.

5. Construction method and operational process, according to claim 1, wherein the filling of the excavated main and secondary canals with the water is performed by capturing raw water from the external source, through a pumping system or by gravity, through a connection canal between the external source and the main canal, and before reaching the main canal, treating the water by the water treatment plant, by the high-performance flow floatation system, without need to use filters or water filtration process, and after treating the water, sodium hypochlorite or other oxidizing agent is added in doses to the water.

6. Construction method and operational process, according to claim 1, wherein the high-performance flow flotation system, used for treatment of the water in continuous flow, includes application of flocculant material and coagulant in a watercourse through which the water travels inside the water treatment plant; so that downstream aggregation of floating particulate occurs, defining larger flakes; routing the floating particulate and larger flakes downstream in the watercourse to at least one stage of dissolution and injection of microbubbles of air or concentrated oxygen, causing flotation of the floating particulate and larger flakes; allowing downstream agglomeration of floated material to occur on a surface of the water, which is removed from this watercourse by floating dredging wheel; and as last stage of treatment, adding doses of sodium hypochlorite or other oxidizing agent to the water.

7. Construction method and operational process, according to claim 1, comprising performing stages of coagulation and flocculation in continuous flow of a treatment canal with control of power applied in coagulation and flocculation through injection of thin, medium and thick bubbles, with variable and controlled intensity, to thereby control the power.

8. Construction method and operational process, according claim 1, wherein continuous treatment of the water of the main and secondary canals is carried out by capturing of the water from the main and secondary canals, with its targeting upstream to the treatment station, to be treated together with the water collected from the external water source.

9. Construction method and operational process, according to claim 1, wherein the main canal is provided with the overflow point, responsible for equalization of water level in the main and secondary canals and for the complete emptying of the main and secondary canals, and through this overflow point excess water, already treated, is returned to the external water source.

10. Construction method and operational process, according to claim 1, wherein the excavated main and secondary canals, do not have any physical division or space between them.

11. Construction method and operational process, according to claim 1, wherein it is provided, for closed circuit circulation of the water of the main and secondary canals, installation of the axial pumping system along the main canal, which also performs adding doses of sodium hypochlorite or other oxidizing agent, and this axial pumping system is housed inside a protection grid.

12. Construction method and operational process, according to claim 1, wherein the mechanical or hydraulic pulse is provided, along the main canal, which, when releasing a shock wave, creates waves or ripples in the main and secondary canals, the shock wave also being responsible for movement of decanted waste, that begin moving and enter in current circulation of the main and secondary canals, until being captured and taken to the water treatment plant by flotation, for new treatment.

* * * * *